Patented Sept. 2, 1947

2,426,728

UNITED STATES PATENT OFFICE 2,426,728

MOLECULARLY ORIENTED COPOLYMERS OF ACRYLONITRILE, A SATURATED MONOHYDRIC ALCOHOL ESTER OF AN ETHYLENE ALPHA BETA DICARBOXYLIC ACID, AND ACRYLIC ESTERS OR VINYL ETHERS

Gaetano F. D'Alelio, Northampton, Mass., assignor to Pro-phy-lac-tic Brush Company, Northampton, Mass., a corporation of Delaware No Drawing. Application February 25, 1944,
Serial No. 523,903

11 Claims. (Cl. 18—54)

This invention relates to novel synthetic compositions comprising copolymers of acrylonitrile, and an ethylene alpha beta dicarboxylic acid ester of a saturated monohydric alcohol, and another polymerizable monomer selected from the class of acrylic esters and vinyl ethers. The invention also relates to form structures wherein the molecules have been oriented so that they are parallel with the major surface and which exhibit characteristic X-ray diffraction patterns.

Acrylonitrile has the formula $CH_2=CHCN$. By an ethylene alpha beta dicarboxylic acid ester is meant an organic compound of the formula $$ROOCCH=CHCOOR$$

such as is selected from the class of maleic and fumaric esters. The ethylene alpha, beta dicarboxylic acid esters used in the practice of this invention are characterized by the fact that the only ethylenic unsaturation that they possess resides in the ethylene alpha beta dicarboxylic acid from which the esters are derived. In the formula $$ROOCCH=CHCOOR$$

the term R represents the residue of a monohydroxy alcohol wherein the alcohol possesses only one esterifiable hydroxy group and is devoid of ethylenic and acetylenic unsaturation as denoted by the term saturated monohydric alcohol.

These esters are readily prepared from esterifiable derivatives of maleic and fumaric acid and their anhydrides with suitable alcohols. As examples of alcohols from which the maleic and fumaric esters may be prepared, I may use methyl, ethyl, propyl, isopropyl, butyl, isobutyl, amyl, secondary amyl, isoamyl, mixed amyl, hexyl, cyclopentyl, cyclohexyl, methyl cyclopentyl, methyl cyclohexyl, benzyl, phenethyl, chloroethyl, acetoxyethyl, methoxyethyl, ethoxyethyl, butoxyethyl, phenoxyethyl, chlorphenoxyethyl, acetoxypropyl, methoxypropyl, ethoxypropyl, phenoxypropyl, carbalkoxyethyl, etc., alcohols. The terms maleic and fumaric esters as hereinafter used, refer to the esters of saturated monohydric alcohols as mentioned above and do not embrace unsaturated alcohol esters of maleic and fumaric acids.

The acrylic esters used in the practice of this invention have the structural formula $$CH_2=C-COOR$$
$$\quad\quad |$$
$$\quad\quad R'$$

where R' is a radical selected from the class of hydrogen and methyl radicals and R has the same meaning as used in the formula for maleic and fumaric esters. Additional examples of radicals which may be represented by R are secondary butyl, propyl cyclopentyl, amyl cyclopentyl, dimethyl cyclohexyl, phenyl, xenyl, tolyl, xylyl, ethyl phenyl, propyl phenyl, isopropyl phenyl, phenyl propyl, phenyl butyl, etc. As noted, all of these acrylic esters contain a single polymerizable unsaturated double bond in the acrylic acid residue.

The monovinyl ethers used in the practice of this invention have the formula $$CH_2=CHOR$$

where R has the same meaning as in the formula for the ethylene alpha beta dicarboxylic acid esters mentioned heretofore. In general, the term R is a radical selected from the class of alkyl radicals, aralkyl radicals, aryl radicals, and alkaryl radicals.

Acrylonitrile itself, when polymerized, possesses characteristic properties in that it has a very high softening point and is extremely resistant to the solvent actions of many chemical bodies. Likewise, polyacrylonitrile is far too hard and brittle and has too high a softening point to be used in the preparation of extruded or precipitated bodies wherein the molecules have beeen oriented so that they are parallel with the major surface.

It has been known for some time that when acrylonitrile is copolymerized with certain suitable monomers, the properties of the copolymer are considerably altered even by small quantities of other monomers, and that, from these copolymers, it is possible to produce workable masses. However, it is now recognized that many of these copolymers possess a new element and property in that they are capable of being converted, as for example, by cold drawing, into products and structures wherein the molecules have been oriented so that they are parallel with the major surface and whereby the formed structures exhibit characteristic X-ray diffraction patterns.

In my copending application, Serial No. 445,808, filed June 4, 1942; Serial No. 449,678, filed July 3, 1943; and Serial No. 523,901, filed February 25, 1944, certain copolymers of acrylonitrile were disclosed as capable of being cold drawn into objects that possessed a molecularly oriented structure along the major axis and which exhibited characteristic X-ray diffraction patterns. This was so in spite of the fact that neither acrylonitrile nor the copolymerizable ingredients individually could be cold drawn.

Likewise, it has been shown that polymers of acrylonitrile, when prepared by the ordinary methods, could not be cold drawn to give oriented products when copolymerized with such unsaturated compounds as butadiene, styrene, diethyl maleate, and vinyl acetate. This behavior is not surprising since even at the present state of the art, it is impossible to predict what compounds will yield satisfactory cold-drawn fiber- or film-forming compositions. This is true even of polymeric vinylidene chloride as emphasized in the United States Patent No. 2,233,442 which states that only selected copolymers will yield satisfactory products; e. g., "most of the materials copolymerized with the vinylidene chloride do not in themselves exhibit characteristic X-ray diffraction patterns, and many of the copolymers of vinylidene chloride containing large proportions of these materials are similarly incapable of being drawn into strong pliable articles."

Generally speaking, it may be stated that thermoplastic polymers and copolymers of all types possess little or no tendency to form crystalline patterns exhibited by the compositions of the present invention.

As disclosed in my aforementioned copending applications and in my copending application Serial No. 523,902, filed February 25, 1944, it was shown that not all copolymers of acrylonitrile could be drawn into objects that possessed molecularly oriented structures along the major axis and which exhibited characteristic X-ray diffraction patterns. Previous attempts to prepare suitable copolymers of acrylonitrile and a fumaric and maleic ester which would be suitable to produce cold drawn and oriented products have been unsuccessful. The copolymers of acrylonitrile and maleic and fumaric esters are extremely difficult to prepare. This is particularly true when attempts are made to prepare copolymers which would have sufficient acrylonitrile so that the cold drawing properties may be obtained. Even when copolymers of the desired composition are obtained, such compositions can not be satisfactorily cold drawn to produce the oriented products of this invention, as illustrated in the following examples:

*Example 1*

|  | Parts | | | |
| --- | --- | --- | --- | --- |
|  | a | b | c | d |
| Acrylonitrile | 45 | 40 | 35 | 25 |
| Diethyl Maleate | 5 | 10 | 15 | 25 |
| Benzoyl Peroxide | 0.25 | 0.25 | 0.25 | 0.25 |

Each of the above compositions was placed in glass containers and heated at 50° C. After seven and a quarter hours, the above compositions had all been polymerized. In each case, a white powder was obtained which possessed an exceedingly strong odor of diethyl maleate. The powder was hard and brittle, did not melt on the hot plate at 140° C., and showed no tendency to fiber formation. Apparently, little copolymerization took place and the polymer obtained was largely acrylonitrile.

*Example 2*

|  | Parts | |
| --- | --- | --- |
|  | a | b |
| Acrylonitrile | 35 | 25 |
| Diethyl fumarate | 15 | 25 |
| Benzoyl Peroxide | 0.25 | 0.25 |

The procedure and results were the same as in the preceding example.

*Example 3*

Even when the copolymer is prepared by granulation methods, as in the following example, the copolymer could not be cold drawn and, furthermore, was insoluble in all the ordinary solvents tested, such as acetone, ethyl alcohol and acetic acid.

| | Parts by weight |
| --- | --- |
| Acrylonitrile | 70 |
| Diethyl maleate | 30 |
| Benzoyl peroxide | 1 |
| Polyvinyl alcohol | 2 |
| Distilled water | 400 |

The polyvinyl alcohol is dissolved in the water prior to the addition of the remaining ingredients. The mixture is then heated under agitation at 50° C. until the polymerization is completed. The granular material was then filtered off, washed with distilled water, and dried in a vacuum oven at 50° C. for 24 hours.

I have now discovered it is possible to produce copolymers of acrylonitrile and an ethylene alpha beta unsaturated dicarboxylic acid if the copolymerization is carried out in the presence of another monomer selected from the class of acrylic esters and vinyl ethers as hereinbefore defined. I have also discovered that it is possible to improve the properties of certain copolymers of the invention by cold drawing if the copolymer is obtained by polymerizing a mass comprising as the primary polymerizable ingredients the three components within the following states ratios:

| | Parts |
| --- | --- |
| Acrylonitrile | 55 to 85 |
| Ethylene alpha beta dicarboxylic acid ester | 5 to 30 |
| A third component | 5 to 30 | where the third component is selected from the class of the acrylic esters and the vinyl ethers as previously defined.

These results are unexpected since the components, when polymerized by themselves, are not capable of being cold drawn. For example, the polyacrylic esters or the polyvinyl esters do not exhibit characteristic X-ray diffraction patterns when they are cold drawn. Furthermore, copolymers of the acrylic esters and the vinyl ethers are not satisfactory for the preparation of oriented copolymers exhibiting characteristic X-ray diffraction patterns.

All of the copolymers of this invention cannot be cold drawn. For example, copolymers containing 50% or less of acrylonitrile cannot be cold drawn to give the oriented products of this invention. This is likewise true if the acrylonitrile in the copolymer exceeds approximately 85% by weight of the copolymer. Likewise, if the proportion of the ester of the ethylene alpha beta dicarboxylic acid is increased substantially over 35%, unsatisfactory compositions are obtained. Similarly, high amounts of acrylic esters destroy the cold drawing properties of these copolymers. If the combined value of the ethylene alpha beta dicarboxylic acid ester and the third component, such as the acrylic ester or the vinyl ether exceeds substantially 45%, the copolymer loses a substantial part of the property whereby it can be cold drawn.

The preferred method of forming the oriented articles of this invention involves first, the copolymerization of the selected monomers. Two satisfactory methods of polymerization may be used, the mixture of monomers may be heated alone in the presence of an activating catalyst at a temperature below the boiling point of the mass. As the polymerization proceeds, the temperature may be increased as the vapor pressure of the mass decreases. The copolymer may be freed from any monomer or low molecular weight substances by any of several methods, as, for example, by extracting the polymer with methyl alcohol or steam distilling the polymer.

Alternately, emulsion or granulation polymerization methods may be employed. The granulation method is preferred. This method involves introducing the mixture of monomers, for example, the acrylonitrile, diethyl maleate and the vinyl ether into aqueous solutions containing granulating agents.

Granulating agents are protective colloids which have relatively poor dispersing properties whereby they form nuclei for the formation of the granules of the heteropolymer. Such agents are usually called granulating agents and this process may be defined as the method of preparing these copolymers in granular form which comprise dispersing the polymerizable mixture under agitation.

Examples of such protective colloids and granulating agents are soluble starch, methyl starch, polyvinyl alcohol, partially hydrolysed polyvinyl acetate, gelatine, sodium alginate, soluble salts of cellulose glycolic acid, soluble salts of starch glycolic acid, soluble salts of polyvinyl alcohol glycolic acid, polymethacrylic acid, natural gums, etc.

As catalyst for the polymerization I may use any effective oxygen liberating agent, such as, benzoyl peroxide, sodium persulfate, potassium persulfate, sodium perborate, potassium perborate, hydrogen peroxide, stearyl peroxide, hyperperoxides, etc. Any suitable amount of catalyst may be used depending upon the nature of the catalyst. In general, between 0.1 and 2.0% of catalyst is used depending on the nature of the catalyst and upon the desired rate of polymerization. Part of the catalyst may be introduced at the initiation of the reaction and the remainder during the course of polymerization.

The ratio of the dispersed phase, that is, the mixture of the polymerizable monomers, to the dispersing phase, the water used with the emulsifying agent or protective colloid, may be varied widely. Satisfactory results are obtained in the range of 100 parts of monomer mixture to 100 to 500 parts of the dispersing phase.

Auxiliary organic solvents may likewise be used in the presence of dispersed and dispersing phases, such as dioxane, ethyl alcohol, ethyl acetate, etc. These ingredients may be added directly to the polymerizable mixture or may be present as diluents in the reacting ingredients. In the ordinary method of producing the granular polymers, precipitants are not usually required, but should a small amount of emulsion be obtained with the granular product, the resin contained in the emulsion may be precipitated, e. g., by acid-precipitating agents, by ethyl alcohol, by freezing, or by heating, etc.

In the polymerization process the reaction may be carried out conveniently at room temperatures or temperatures between 50 and 60° C., the time varying from about eight hours to a few days depending upon the composition of the ingredients, the amounts of catalyst, and the temperatures used. It is possible, with very high catalyst concentrations, or with increased temperatures, to decrease the reaction time.

Likewise, acrylonitrile, is preferred to methacrylonitrile because of greater ease of polymerizability, higher softening points, and the greater solvent resistance of the polymers derived from it. Methacrylonitrile may be used in conjunction with acrylonitrile to increase the susceptibility of the copolymer to solvents. Part of the acrylonitrile, of the order of about 5 to 25%, may be replaced by methacrylonitrile.

The copolymers of this invention are not readily adaptable to the ordinary extrusion methods used in the manufacture of thermoplastic resins, such as, for example, the preparation of cellulose acetate fibers.

The copolymers of this invention containing between 70 and 85% acrylonitrile possess a very high melting point in excess of 180° C., though at lower temperatures, say about 150° C., they are rather rubbery but still are not sufficiently cohesive to be extruded to uniform fibers, films and sheets free of bubbles, etc. Furthermore, the pressures required to extrude fine filaments are excessively high.

Copolymers containing more than 55 and less than 70% acrylonitrile have lower softening points and are adapted to extrusion methods. However, when even these copolymers are extruded in this manner, the high temperatures required cause some reduction in their tensile strength.

Another object of this invention is to provide a method of preparing the fibers, filaments, etc., by shaping a gel of the copolymers of this invention, such as by extruding through suitable orifices, etc. This is accomplished by the use of suitable solvents. The high insolubility of the acrylonitrile copolymers excludes the use of many solvents. I have found, however, that the nitrohydrocarbon derivatives are satisfactory in preparing the formed cold-drawn objects of this invention.

Thus, in preparing films of the copolymers of this invention, I dissolve the copolymer in a nitrohydrocarbon, for example, nitromethane, nitroethane, to produce a solution containing between 8 and 12% of the polymer in the nitrohydrocarbon, cast the films and remove the solvent by evaporation. After the sheet is formed, it is cold drawn during which process molecular orientation takes place along the major surface. The sheet in itself, as prepared, is not molecularly oriented. It is only after the cold drawing process that it exhibits characteristic X-ray diffraction patterns indicative of crystalline orientation. The increase in tensile strength and flexibility after the cold drawing is remarkable. On the other hand, fibers that are spun from the same hydrocarbon solutions are not completely satisfactory. Because of their insolubility and because of the use of large amounts of solvent which must be removed, they must be subjected to a long period of heat to remove substantially all of the solvent.

I have now discovered that it is possible to produce more satisfactory sheets, fibers, filaments, and the like from the copolymers of this invention by shaping a gelled mass of the copolymer, as by extrusion. For example, a copolymer of 70 parts of acrylonitrile and 15 parts of a vinyl ether or an acrylic ester and 15 parts of a maleic or fumaric ester is soluble in nitromethane to the extent of 14%. If this solution is concentrated such as by heat under atmospheric or reduced pressure, the mixture loses the characteristics of a solution and acquires the properties of a gel; that is, the nitrohydrocarbon reverses phase and becomes dissolved in the copolymer, rather than the copolymer dissolved in the nitrohydrocarbon. The gel nature of this particular copolymer becomes evident at room temperature at about 15% copolymer and 85% nitromethane. As this gel is heated, the viscosity decreases considerably so that it exhibits a cohesive flow at temperatures of the order of 55 to 90° C.

However, it is not necessary to prepare these gels by first dissolving the polymer in the hydrocarbon and concentrating the solution. I may prepare these gels by adding the desired amount of nitrohydrocarbon to the copolymer and forming the gel in suitable processing equipment, such as in a steam-heated dough mixer, Banbury mixer, rubber or plastic milling rolls, etc. Once prepared, the gel is degassed at a temperature above room temperature and sufficient to liquefy the gel. The degassed gel is then extruded into fibers and sheets at an orifice temperature so that the liquid nature of the gel is maintained. The extruded form resets as a gel after leaving the orifice and is dried at a low temperature to remove a quantity of the gelation solvent so that the gel does not reliquefy even when heated to progressively higher temperatures. When produced in this form, the copolymer can be given any desirable shape, such as, by extrusion or calendering, and then (1) the gelation solvent removed by suitable means and the formed article cold drawn or (2) part of the gelation solvent is removed and the polymer cold drawn and the remainder of the solvent removed, or (3) none of the gelation solvent may be removed prior to cold drawing. The latter method, however, is not the preferred method since these gels are usually weak in their structural properties. The preferred method comprises eliminating some, or a substantial part, of the gelation solvent prior to cold drawing.

The cold drawing may be accomplished at any suitable temperature from room temperature or slightly below up to temperatures of the order of 70 to 100° C. The extent of the cold drawing depends on the composition of the mass and, in general, cold drawing of the order of 100 to 500% may be accomplished.

The following examples illustrate how this invention may be carried into effect:

Example 4

Each of the following ratios of acrylonitrile, an acrylic ester and a maleic ester in which was dissolved 0.2% of benzoyl peroxide was placed in a glass container and polymerized at 50° C. until the polymerization was complete.

|  | A | B | C |
|---|---|---|---|
| Acrylonitrile | 60 | 70 | 70 |
| Ethyl acrylate | 20 | 20 | 25 |
| Dibutyl maleate | 20 | 10 | 5 |

The copolymers of the above compositions were dissolved in nitromethane to give solutions of approximately 5 to 6% of the copolymer in the nitrohydrocarbon. Films were cast from these solutions and the solvent allowed to evaporate, first at room temperature and then in an oven at 80° C. The average thickness of the films varied from 0.001 to 0.003 inch with tensile strengths varying from 5,000 to 10,000 pounds per square inch depending upon the amount of acrylonitrile in the copolymer. The films containing the higher acrylonitrile had the higher tensile strengths.

Due to the high amount of acrylonitrile, these films are stiff and rigid and not readily subjected to flexing. When cold drawn 200 or 300% at room temperature, a sheet material exhibiting orientation along the main axis and possessing increased strength and flexibility was obtained.

The increase in tensile strength of these sheets was remarkable, ranging in order from 10,000 to 25,000 when cold drawn at room temperature. When drawn at higher temperatures, it is possible to achieve a cold drawing of the order of 300 to 500% and to obtain tensile strengths in compositions containing at least 70% acrylonitrile to the order of 15,000 to 40,000 pounds per square inch. The yields of the copolymers prepared above were quantitative.

Example 5

Each of the following ratios of components in which was dissolved 1% benzoyl peroxide was placed in a glass container and polymerized under the influence of sunlight for several hours and then placed in an 80° C. oven to complete the polymerization. The copolymers were all tough resins which were soluble in nitromethane. Films were cast from the nitromethane solution and tested before and after drawing at room temperature. Values ranging from 5,000 to 10,000 pounds undrawn and 15,000 to 35,000 pounds in the cold drawn condition were obtained.

|  | Acrylonitrile | Ethyl Acrylate | Ethyl Maleate |
|---|---|---|---|
| a | 60 | 5 | 35 |
| b | 60 | 10 | 30 |
| c | 60 | 20 | 20 |
| d | 60 | 25 | 15 |
| e | 60 | 30 | 10 |
| f | 60 | 35 | 5 |
| g | 65 | 5 | 30 |
| h | 65 | 10 | 25 |
| i | 65 | 15 | 20 |
| j | 65 | 20 | 15 |
| k | 65 | 25 | 10 |
| l | 65 | 30 | 5 |
| m | 70 | 5 | 25 |
| n | 70 | 10 | 20 |
| o | 70 | 20 | 10 |
| p | 70 | 25 | 5 |

Example 6

The following example indicates how the copolymer may be prepared in granular form.

|  | Parts |
|---|---|
| Acrylonitrile | 70 |
| Diethyl maleate | 15 |
| Ethyl acrylate | 15 |
| Benzoyl peroxide | 1 |
| Polyvinyl alcohol | 2 |
| Distilled water | 400 |

The polyvinyl alcohol is dissolved in water prior to the addition of the remaining ingredients. The mixture is then heated under agitation at 50 to 60° C. until the polymerization is completed. The granular material is in the form of spheres which are filtered off, washed with distilled water, and dried in a vacuum oven at 50° C. The copolymer is soluble in nitromethane from which it is possible to produce sheets and fibers of high tensile strength by cold drawing the composition after substantially all of the nitromethane has been removed.

Example 7

The following example illustrates how a gelled mass may be used in the preparation of oriented products. When any one of the nitrohydrocarbon solutions of the previous examples is concentrated to 15% or more of the polymer in the nitrohydrocarbon, a mass is obtained which is a gel at room temperature. This gel can be concentrated under heat to between 18 and 20% solids and when freed of bubbles and solid impurities, it can be extruded through orifices and dried by evaporation of the nitromethane solvent. Fibers or sheet materials obtained in this way are harsh and stiff due to the high concentration of acrylonitrile. When cold drawn, these materials acquire excellent flexibility and possess a considerable increase in strength and exhibit crystalline orientation along the major axis. Filaments produced by this cold drawing process can be drawn into tight knots without breaking.

Example 8

The following example indicates the gel process for the preparation of filaments and fibers of the copolymers of this invention. 100 parts of the copolymer of acrylonitrile (70%) and fumaric or maleic ester (10 to 15%) and an acrylic ester or vinyl ether (15 to 20%) are introduced into a steam-heated jacketed dough mixer together with 325 parts of nitromethane and processed at 75 to 100° C. to produce a highly viscous plastic mass, the characteristics of which are such that, when allowed to cool to room temperature, a rigid rubbery gel is obtained. This material can not be filtered readily at room temperature. The highly viscous plastic mass is passed through candle filters at 75 to 95° C. and under pressure to remove contamination, undissolved particles, etc.

The filtered mass is degassed under a vacuum of 2 to 10 inches or higher at 50 to 90° C. The degassed plastic mass is ready for spinning and is forced by constant pressure pumps through spinnerets. The complete system, that is, the reservoir spinning pumps, nozzles, etc., and the spinnerets, are maintained at a temperature sufficient to keep the mass in a plastic viscous condition. The temperature of the spinnerets is approximately 65 to 90° C. As the plastic mass leaves the spinneret, the filament is immediately converted to a rigid gel by passing through an immediate area whose temperature is lower than the spinneret temperature.

Example 9

When the vinyl ethers used in the practice of this invention are substituted for the acrylic esters of the preceding examples, results are obtained similar to those of Example 7. Examples of special compositions which may be used to yield excellent results are

|   | Parts |
|---|---|
| Acrylonitrile | 70 |
| Vinyl butyl ether | 20 |
| Dimethyl maleate | 10 |

In the practice of this invention, the nitrohydrocarbons were found to be the most suitable materials either when used as true solvents or gelation solvents. Since these solvents are used in intermediate stages in the execution of this invention, it is desirable that such solvents have low boiling points so that they may be removed readily from the copolymer mass. Among suitable nitrohydrocarbon solvents may be mentioned nitro-aliphatics, such as nitromethane, nitroethane, nitropropane, nitrobutane; the nitro-aromatics; and the nitro-cyclo-aliphatics. Also, there may be used in connection with them, but preferably in minor proportions, certain ketones, for instance, acetone, methyl ethyl ketone, methyl propyl ketone, methyl amyl ketone, acetophenone, phorone, methyl chlorphenyl ketone, methyl nitrophenyl ketone, chlor-ethyl, nitrophenyl ketone, diacetone alcohol, acetonyl acetone, acetyl acetone, biacetyl, methyl acetoacetic ester, ethyl acetoacetic ester, etc.; the nitro-alcohols such as, 2-nitro-1-ethanol, 2-nitro-1-propanol, 2-nitro-1-butanol, 2-nitro-1-pentanol, etc.; esters of the aforementioned nitro-alcohols, such as, the formate, the acetate, the propionate, the butyrate, etc.; the ethers of the aforementioned nitro-alcohols, for example, the methyl, the ethyl, the propyl, and the butyl ethers, etc.; the cyano-alcohols, for example, lactonitrile, the addition products of the lower-boiling aldehydes and ketones with hydrogen cyanide, for example, the reaction products of hydrogen cyanide with acetaldehyde, propionaldehyde, acetone, methyl ethyl ketone, etc.; the esters of the cyano-alcohols, for example, the formate, the acetate, the propionate, etc.; the ethers of the cyano-alcohols, for example, the methyl, ethyl, propyl, etc. ethers. Certain phosphates such as trimethyl and triethyl phosphates may likewise be used. The foregoing gelation agents are mentioned by way of illustration and not as limitations, except where limitations are found in the claims appended hereto, since I believe myself to be the first to discover the possibility of making a gel from the materials in question and the process of utilizing the gel.

Since it is extremely difficult to incorporate plasticizers into the copolymers of this invention by the ordinary milling process, I prefer to accomplish this by adding the plasticizer either to a solution or to a gel of the copolymer in the solvents mentioned heretofore.

By this method, many plasticizers which normally do not possess good compatibility with the polymer may be incorporated into the polymer. Suitable high-boiling plasticizers may be mentioned, the polybasic esters of cyano alcohol and of the nitro alcohols, such as, the esters of phthalic, succinic, sebacic, tetrahydrophthalic, endomethylene, tetra-hydrophthalic, acetyl citric acids, etc. It is not necessary that all of the carboxyl groups of the polybasic acid be esterified with the cyano alcohol or the nitro alcohol. Thus, in a dicarboxylic acid, one carboxyl group may be esterified with the cyanoalcohol and the other with the methyl, ethyl, propyl, butyl alcohols, etc.; and in a tricarboxylic acid, it is sufficient if one or two of the carboxyl groups are esterified with the cyano alcohol and the residual carboxyl groups esterified with another alcohol. Also, as suitable plasticizers for the products of this invention may be mentioned the condensation products of acrylonitrile with organic compounds containing active hydrogen such as, for example, the condensation product of an acrylonitrile and acetone wherein the hydrogens of the —$CH_3$ groups of the acetone may be substituted by from one to six $\beta$-cyanoethyl groupings. Other plasticizers which may be prepared by the condensation of acrylonitrile with organic compounds containing active hydrogen are the condensation products with alcohols, for example, with phenyl ethyl alcohol, phenoxyethyl alcohol, methoxy diethylene glycol, ethoxy diethylene glycol, phenoxy diethylene glycol, etc., condensation products of acrylonitrile with such compounds as the acetoacetic esters, malonic esters, acetyl acetone, and certain polycyclic hydrocarbons containing active $CH_2$< groupings, the condensation products of acrylonitrile with cyano and nitro alcohols, etc.

Certain other advantages accrue to the use of this invention through the use of the ethylene alpha beta dicarboxylic acid esters in that a single monomer, such as diethyl maleate or dipropyl maleate, introduces two ester groups per single ethylenic double bond. These ester groups increase the internal plasticity of the resin molecule and induce high compatibility with the normal ester plasticizers used in the plastics art. As examples of such ester plasticizers may be mentioned the phosphate esters, such as the triphenyl, tricresyl, benzyl, chlorphenyl, nitrophenyl, etc. phosphates; the mixed phosphate esters, such as phenyl dicresyl, diphenyl monocresyl, etc.; other esters, such as dimethyl phthalate, diethyl phthalate, dibenzyl sebacate, dibutyl sebacate, diethylene glycol dihexoate, dibutoxyethyl sebacate, dicrotyl azeleate, methyl octyl phthalate, octyl chlorbenzoate, tetrahydrofurfuryl sebacate, tetrahydrofurfuryl fumarate, etc.

Preferably those esters are used that have at least one ester group corresponding to one of the ester groups in the ethylene alpha beta dicarboxylic acid ester or a hydrocarbon group corresponding to a hydrocarbon group of the vinyl ether used in the preparation of the copolymer.

The fibers and similar articles produced according to this invention may be woven into highly insoluble and chemical resistant cloth for use in filter cloths and handling chemicals and the like. They may also be used for textiles, for example, cloth, hosiery, articles of clothing, etc. In the form of sheets, they may be used as protective coatings, awnings, raincoats, shower curtains, aprons, hospital bed sheeting, containers for hydrocarbon oils, gasoline, kerosene, ointments, etc.

I claim:

1. A cold drawn molecularly oriented article showing characteristic crystalline X-ray diffraction patterns which comprises essentially a copolymerization product of a mixture comprising (1) at least 55 percent but not more than 85% of acrylonitrile, (2) at least 5 percent but not more than 30% of an ethylene alpha beta dicarboxylic acid diester of a saturated monohydric alcohol having the formula ROOCCH=CHCOOR, and (3) at least 5 but not more than 30% of a monomer selected from the group consisting of acrylic esters of the formula CH$_2$=CR'COOR and vinyl ethers of the formula CH$_2$=CHOR wherein R' is selected from the group consisting of hydrogen and methyl radicals and R is a saturated alkyl radical having 1 to 6 carbon atoms.

2. A molecularly oriented fiber which exhibits characteristic crystalline X-ray diffraction patterns which comprises essentially a cold drawn copolymerization product of a mixture comprising (1) at least 55 per cent but not more than 85% of acrylonitrile, (2) at least 5 percent but not more than 30% of an ethylene alpha beta dicarboxylic acid diester of a saturated monohydric alcohol having the formula

ROOCCH=CHCOOR and (3) at least 5 but not more than 30% of a monomer selected from the group consisting of acrylic esters of the formula CH$_2$=CR'COOR and vinyl ethers of the formula CH$_2$=CHOR wherein R' is selected from the group consisting of hydrogen and methyl radicals and R is a saturated alkyl radical having 1 to 6 carbon atoms.

3. A molecularly oriented fiber which exhibits characteristic crystalline X-ray diffraction patterns which comprises essentially a cold drawn copolymerization product of a mixture comprising (1) at least 55 percent but not more than 85 percent of acrylonitrile (2) at least 5 but not more than 30 percent of an ethylene alpha beta dicarboxylic acid diester of a saturated monohydric alcohol of the formula ROOCCH=CHCOOR where R is a radical selected from the group consisting of alkyl, aralkyl, aryl and alkaryl radicals, and (3) at least 5 percent but not more than 30 percent of vinyl butyl ether.

4. A molecularly oriented fiber which exhibits characteristic crystalline X-ray diffraction patterns which comprises essentially a cold drawn copolymerization product of a mixture comprising (1) at least 55 percent but not more than 85 percent of acrylonitrile, (2) at least 5 but not more than 30 percent of an ethylene alpha beta dicarboxylic acid diester of a saturated monohydric alcohol of the formula

ROOCCH=CHCOOR where R is a radical selected from the group consisting of alkyl, aralkyl, aryl and alkaryl radicals, and (3) at least 5 percent but not more than 30 per cent of n-butyl vinyl ether.

5. A molecularly oriented fiber which exhibits characteristic crystalline X-ray diffraction patterns which comprises essentially a cold drawn copolymerization product of a mixture comprising (1) at least 55 percent but not more than 85 percent of acrylonitrile, (2) at least 5 but not more than 30 percent of an ethylene alpha beta dicarboxylic acid diester of a saturated monohydric alcohol of the formula ROOCCH=CHCOOR where R is a radical selected from the group consisting of alkyl, aralkyl, aryl and alkaryl radicals, and (3) at least 5 percent but not more than 30 percent of vinyl isobutyl ether.

6. A molecularly oriented fiber showing characteristic crystalline X-ray diffraction patterns which comprises a cold drawn copolymerization product of a mixture comprising 70 parts of acrylonitrile, 15 parts of a vinyl butyl ether, and 15 parts of diethyl maleate.

7. A molecularly oriented sheet showing characteristic crystalline X-ray diffraction patterns which comprises a cold drawn copolymerization product of a mixture comprising (1) at least 55 percent but not more than 85% of acrylonitrile, (2) at least 5 percent but not more than 30% of an ethylene alpha, beta dicarboxylic acid diester of a saturated monohydric alcohol having the formula ROOCCH=CHCOOR, and (3) at least 5 but not more than 30% of a monomer selected from the group consisting of acrylic esters of the formula CH$_2$=CR'COOR and vinyl ethers of the formula CH$_2$=CHOR wherein R' is selected from the group consisting of hydrogen and methyl radicals and R is a saturated alkyl radical having 1 to 6 carbon atoms.

8. A composition comprising the copolymerization product of a mixture comprising (1) at least 55% but not more than 85% of acrylonitrile, (2) at least 5% but not more than 30% of an ethylene alpha beta dicarboxylic acid diester of a saturated monohydric alcohol having the formula ROOCCH=CHCOOR, and (3) at least 5% but not more than 30% of a polymerizable monomer selected from the group consisting of acrylic esters of the formula CH$_2$=CR'COOR and vinyl ethers of the formula CH$_2$=CHOR wherein R' is selected from the group consisting of hydrogen and methyl radicals and R is a saturated alkyl radical having 1 to 6 carbon atoms.

9. A cold drawn molecularly oriented article showing characteristic crystalline X-ray diffraction patterns which comprises essentially a copolymerization product of a mixture comprising (1) at least 55 percent but not more than 85% of acrylonitrile, (2) at least 5 percent but not more than 30% of an ethylene alpha beta dicarboxylic acid diester of a saturated monohydric alcohol having the formula

ROOCCH=CHCOOR and (3) at least 5 but not more than 30% of a monomer selected from the group consisting of acrylic esters of the formula $CH_2=CR'COOR$ and vinyl ethers of the formula $CH_2=CHOR$ wherein R' is selected from the group consisting of hydrogen and methyl radicals and R is a saturated alkyl radical having 1 to 6 carbon atoms, said article being plasticized with a cyano alcohol ester of a polycarboxylic acid.

10. A cohesive workable reversible gel adapted to the preparation of shaped or molecularly oriented structures which is essentially a liquid nitrohydrocarbon and the polymerization product of a mixture comprising (1) at least 55 percent but not more than 85% of acrylonitrile, (2) at least 5 percent but not more than 30% of an ethylene alpha beta dicarboxylic acid diester of a saturated monohydric alcohol having the formula ROOCCH=CHCOOR, and (3) at least 5 but not more than 30% of a monomer selected from the group consisting of acrylic esters of the formula $CH_2=CR'COOR$ and vinyl ethers of the formula $CH_2=CHOR$ wherein R' is selected from the group consisting of hydrogen and methyl radicals and R is a saturated alkyl radical having 1 to 6 carbon atoms.

11. A molecularly oriented article showing characteristic crystalline X-ray diffraction patterns which comprises a cold drawn copolymerization product of a mixture comprising (1) at least 55 percent but not more than 85 percent of acrylonitrile, (2) at least 5 percent but not more than 30 percent of a vinyl butyl ether, and (3) at least 5 percent but not more than 30 percent of an ester of the formula ROOCCH—CHCOOR where R is a saturated alkyl radical having 1 to 6 carbon atoms.

GAETANO F. D'ALELIO.

REFERENCES CITED

The following references are of record in the file of this patent:

UNITED STATES PATENTS

| Number | Name | Date |
|---|---|---|
| 1,929,453 | Semon | Oct. 10, 1943 |
| 2,016,490 | Fikentscher | Oct. 8, 1935 |
| 1,933,052 | Fikentscher et al. | Oct. 31, 1933 |
| 2,047,398 | Voss et al. | July 14, 1936 |
| 2,367,493 | Fordyce et al. | Jan. 16, 1945 |

FOREIGN PATENTS

| Number | Country | Date |
|---|---|---|
| 387,976 | Great Britain | Feb. 16, 1943 |
| 466,898 | Great Britain | Dec. 14, 1936 |
| 519,788 | Great Britain | Apr. 5, 1940 |